United States Patent [19]
Fletcher et al.

[11] 3,869,210
[45] Mar. 4, 1975

[54] LASER SYSTEM WITH AN ANTIRESONANT OPTICAL RING

[76] Inventors: James C. Fletcher, Administrator of the National Aeronautics and Space Administration with respect to an invention of; Anthony E. Siegman, Stanford, Calif.

[22] Filed: Nov. 2, 1973

[21] Appl. No.: 412,080

[52] U.S. Cl. .................................. 356/106 LR
[51] Int. Cl. .............................. H01s 3/10
[58] Field of Search ........................ 356/106 LR

[56] References Cited
UNITED STATES PATENTS

| | | | |
|---|---|---|---|
| 3,392,622 | 7/1968 | Senf | 356/106 LR |
| 3,528,029 | 9/1970 | Holmboe et al. | 356/106 LR X |
| 3,625,590 | 12/1971 | Habegger | 356/106 LR X |

*Primary Examiner*—Archie R. Borchelt
*Attorney, Agent, or Firm*—Monte F. Mott; Paul F. McCaul; John R. Manning

[57] ABSTRACT

Various applications of an antiresonant ring, consisting of a beam splitter and a number of optical reflectors, are disclosed. With a beam splitter having a transmission coefficient $t_1$ and a reflection coefficient $r_1$ where $t_1 = r_1$, an optical beam incident on the beam splitter along a first axis is split into two components which circulate around the ring in opposite directions and are recombined to reflect back the beam along the first axis, with none of the beam power being directed along a second axis. The ring can be used as part of the cavity of two otherwise independent lasers, with two separate laser mediums external to the ring, or with a multi-wavelength laser medium in the ring. The ring together with a second-harmonic generation crystal and a dispersive phase shifter in the ring can be used to generate the second harmonic of an optical beam. By proper incorporation of phase shifting means in the ring, optical pulse switching, laser mode locking, and/or laser cavity dumping can be achieved.

14 Claims, 9 Drawing Figures

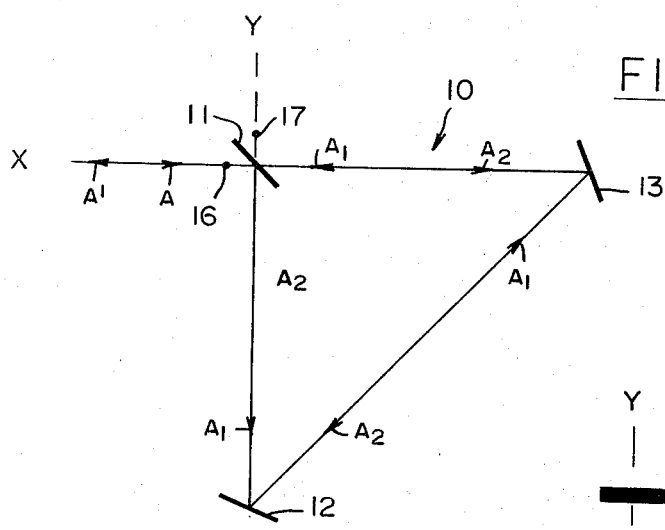
FIG. 1
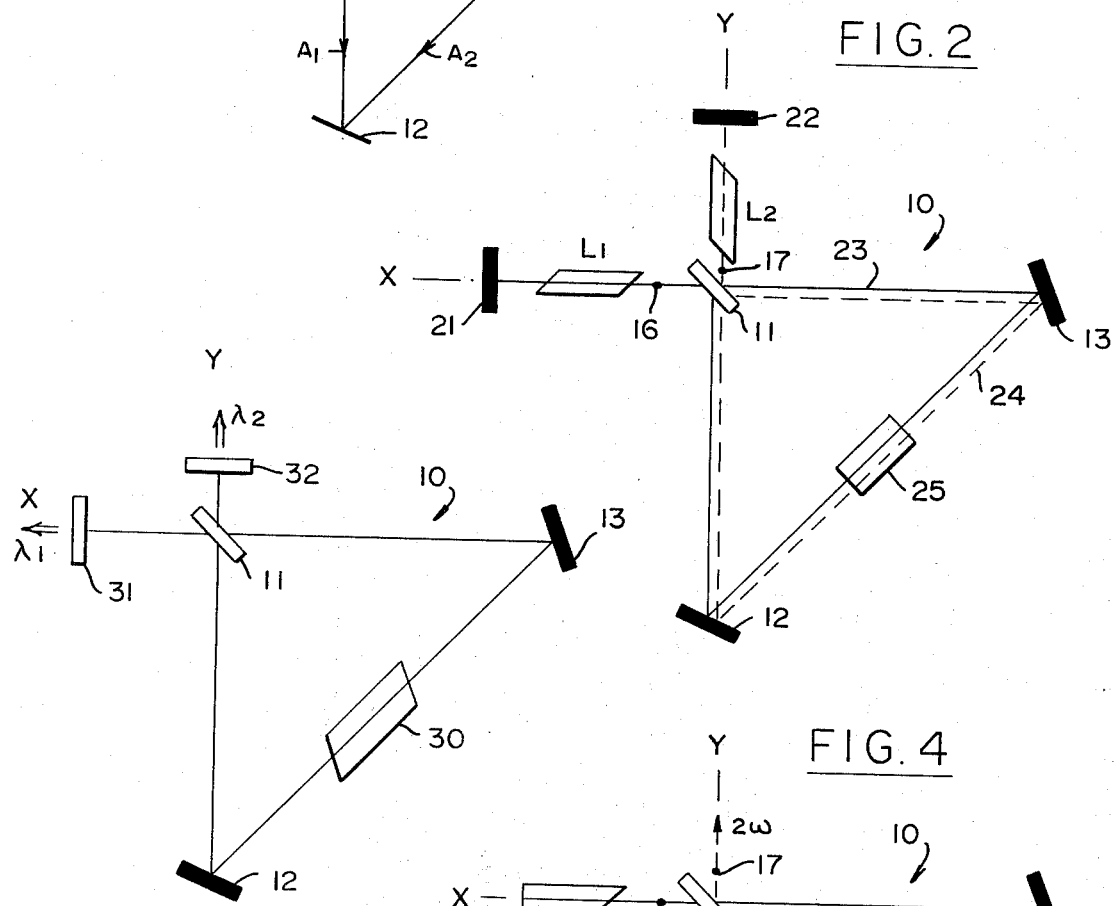
FIG. 2
FIG. 3
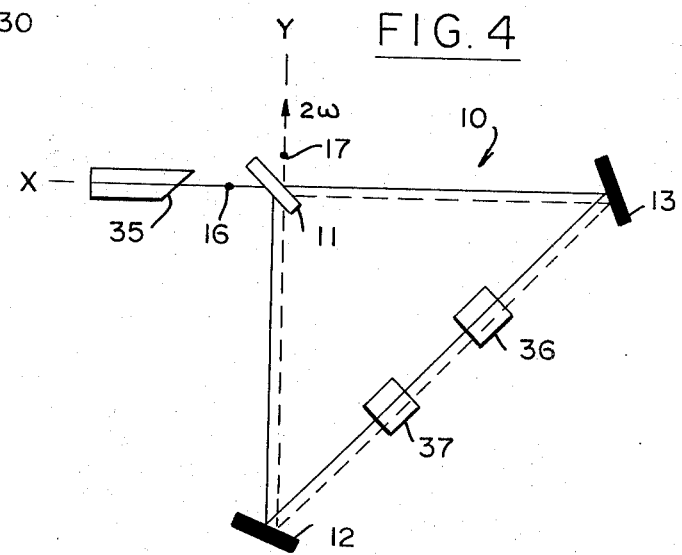
FIG. 4

LASER SYSTEM WITH AN ANTIRESONANT OPTICAL RING

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention generally relates to lasers and to optical pulse switching in connection with lasers. It relates more particularly to lasers with a novel antiresonant optical ring which is particularly adapted for several different laser applications, including optical switching, laser mode locking and cavity dumping.

2. Description of the Prior Art:

At present, lasers are extensively employed in both scientific research and commercial applications. Briefly, a laser defines a cavity wherein a stimulated medium, often referred to as the laser of lasing medium, is positioned between two end mirrors. The optical beam which is stimulated in the cavity generally exits at the output beam through one of the end mirrors, which is partially transmissive. Some lasers operate in a continuous mode while others operate in a pulsed mode. Sometimes lasers are mode locked by means of mode-locking modulators to produce beams or beam pulses of very short time duration. In some applications techniques are employed to switch or "dump" the beam or beam pulses out of the cavity only when the beam power reaches desired levels and/or at precise instances or specified time intervals. For some of these purposes, acoustic-wave cavity dumpers have been used.

It has been discovered that mode locking and/or cavity dumping as well as other uses of lasers can be greatly facilitated by incorporating together with a laser, an optical arrangement, hereinafter referred to as an antiresonant optical ring or simply an optical ring.

OBJECTS AND SUMMARY OF THE INVENTION

It is a primary object of the present invention to provide a novel laser incorporating an antiresonant ring.

Another object of the invention is to provide a novel laser arrangement adapted for various laser applications.

Another object of the invention is to provide a laser pulse switching method whereby an optical pulse may be rapidly switched from one optical channel into another.

A further object of the invention is to provide a novel laser arrangement in which mode locking and/or cavity dumping are attainable in a novel manner.

These and other objects of the invention are achieved by providing an optical arrangement in the form of an antiresonant optical ring, consisting of a beam splitter and at least a pair of mirrors or similar optical reflectors. The beam-splitter power division ratio is close to 50-50, i.e., its transmission coefficient is equal to the reflection coefficient of either beam splitter face. In the absence of any phase shifting means inside the ring, any beam which is incident on the beam splitter is split into two parts which circulate through the ring in opposite directions, and are recombined constructively at the beam splitter to form a beam which is reflected along the axis from which the incident beam was directed, hereinafter defined as the incident axis. Components of the beam parts which circulate through the ring add destructively at the beam splitter in a second direction or axis, hereinafter defined as the transverse axis. Thus, none of the beam power exits along the transverse axis. By proper phase control inside the ring, as will be described hereinafter, switching of the optical beam from the incident axis to the transverse axis may be achieved. Also, mode-locking of an associated laser or cavity dumping of the laser along the transverse axis is achievable. In addition, a beam which is the second harmonic of the fundamental harmonic of the beam along the incident axis, may be generated along the transverse axis. Furthermore, the ring may be used as a common mirror for two independent lasers so that two beams of different wavelengths propagate therethrough.

The novel features of the invention are set forth with particularity in the appended claims. The invention will best be understood from the following description when read in conjunction with the accompanying drawings.

BRIEF DESCRIPTION OF THE DRAWINGS

FIG. 1 is a diagram of an antiresonant optical ring, used in the embodiments of the present invention;

FIGS. 2-4 are diagrams of different embodiments of the invention;

DESCRIPTION OF THE PREFERRED EMBODIMENTS

Figure 4A:
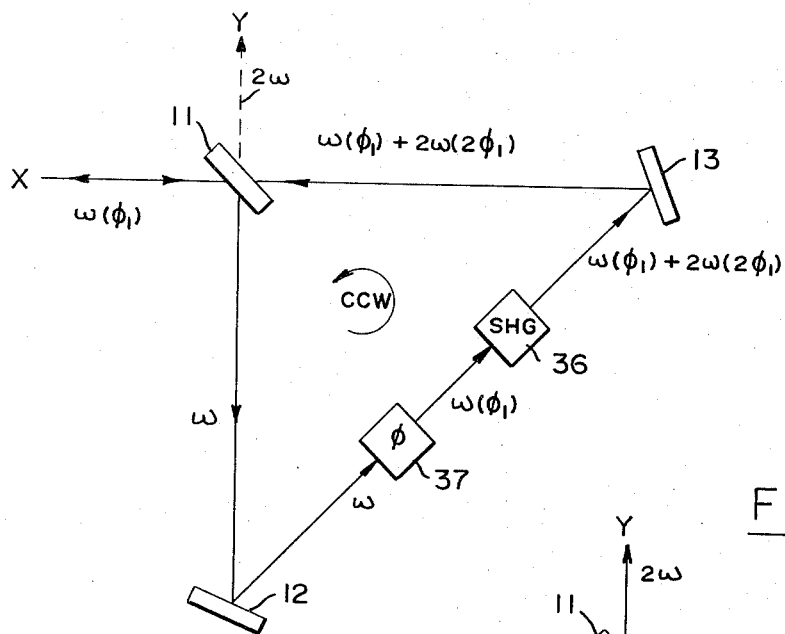
FIGS. 4a and 4b are diagrams useful in explaining the operation of the embodiment shown in FIG. 4.

Before proceeding to describe various embodiments of the present invention, the antiresonant optical ring, which is incorporated in each of these embodiments will first be described. In FIG. 1, the ring, designated by numeral 10, is shown comprising a beam splitter 11 and a pair of reflecting mirrors 12 and 13. Let it be assumed that the beam splitter 11 is characterized by transmission coefficient $t_1$ and a reflection coefficient of $r_1$ and that $t_1 = r_1$. It is further assumed that an optical beam A is directed toward beam splitter 11 along direction on axis X and is incident on the beam splitter 11. The latter divides the beam A into two partial beams $A_1$ and $A_2$. Beam $A_1$ is reflected by beam splitter 11 toward mirror 12. The latter reflects $A_1$ toward mirror 13 which in turn reflects it to beam splitter 11. Thus, beam $A_1$ propagates counterclockwise (CCW) in the ring 10. Similarly, beam $A_2$ propagates, i.e., is transmitted through beam splitter 11, is reflected off mirror 13 to mirror 12 and therefrom is reflected to beam splitter 11. Thus, $A_2$ travels clockwise (CW) in ring 10.

The two mirrors 12 and 13 may be replaced by any combination of beam reflecting and/or beam deflecting or redirecting devices, such as mirrors, prisms, or other common optical elements, such that an incident beam component passing through the beam splitter along the incident axis eventually returns to the same point on the beam splitter along the transverse axis, and an incident beam component reflected off the beam splitter parallel to the transverse axis eventually returns along the incident axis.

When each of beams $A_1$ and $A_2$ returns to the beam splitter 11, in accordance with theory, it splits into two components, one which is transmitted through the beam splitter and the other which is reflected therefrom. The component of $A_1$ which is transmitted through the beam splitter 11 and the component of $A_2$ which is reflected off the beam splitter add constructively, i.e., in phase, producing a reflected beam $A'$. The reflected beam $A'$ propagates along the same axis X as the incident beam A, except in the opposite direction. However, the component of $A_1$ which is reflected by beam splitter 11 along the transverse axis, designated as Y, and the component of $A_2$ which is transmitted through the beam splitter along the same axis add destructively since these two components are exactly 180° out of phase (when $t_1 = r_1$). The 180° phase difference is due to the fact that the $A_1$ beam component along axis Y experiences two reflections by the beam splitter, while the $A_2$ beam component of $A_2$ experiences two transmissions. The difference between two transmissions and two reflections represents a 180° phase difference. Due to this phase difference, none of the power of incident beam A propagates along axis Y.

In FIG. 1, numerals 16 and 17 designate external arms or ports along axes X and Y. It can thus be stated that a beam incident on the ring through port 16 results in a beam which is reflected back through port 16, while no radiation is produced through port 17. Clearly, a beam incident through port 17 would result in a reflected beam through the same port 17 with no radiation through port 16. That is, the ring provides essentially 100 percent return reflectivity for a beam entering through either port or arm, with zero cross-coupling beween the external ports. This characteristic is independent of the beam's frequency or the length of the ring. Thus, the ring is definable as an antiresonant optical ring, since it is frequency independent.

The optical properties of the ring 10 can also be analyzed and explained as follows. Suppose the beam splitter 11 has wave-amplitude transmission coefficient $t_1$ (power transmission coefficient $t_1^2$) for transmission through the beam splitter in either direction and reflection coefficient $+r_1$ and $-r_1$ for reflection off the front and back faces 11a and 11b, respectively. Let the wave propagating around the inside of the ring have net gain and phase shift $ge^{-j\psi}$ in either direction, where $g \leq 1$ for a passive cavity. Then, the effective reflection coefficient looking into the ring from either of its external arms is readily found to be $$\mu_{refl}/\mu_{inc} = 2r_1t_1ge^{-j\psi},$$

while the transmission coefficient from one external arm to the other is $$\mu_{trans}/\mu_{inc} = (t_1^2 - r_1^2)ge^{-j\psi}.$$

If the beam splitter is exactly 50-50 ($r_1t_1 = 2^{-1/2}$) and if $g \approx 1$, then the back reflectivity is essentially 1 in all cases. That is, the ring provides essentially 100 percent reflectivity for either external arm back into itself and zero cross coupling between the external arms, independent of the laser frequency or the length of the ring.

Attention is now directed to FIG. 2 in which one embodiment of the invention is diagrammed. Therein, elements like those previously described are designated by like numerals. In FIG. 2, $L_1$ along axis X designates a laser medium which together with a mirror 21 and the ring 10 define one laser, hereinafter referred to as laser $L_1$. Similarly, $L_2$ along axis Y designates another laser medium, which together with a mirror 22 and ring 10 form another laser, hereinafter referred to as laser $L_2$. The ring 10 thus forms part of the cavity of each of the lasers and therefore is common to both. The two signals or beams of the two lasers are designated by the solid and dashed lines 23 and 24.

Even though both beams circulate through the ring 10 along a common and coincident optical path, due to the zero cross-coupling beween the ports 16 and 17 there is no intercoupling between the two lasers even though the same ring is shared by both. Since the independent beams of the two lasers circulate through the ring, their effect on any intracavity element, designated in FIG. 2 by numeral 25, can be observed by placing such an element inside the ring, such as between mirrors 12 and 13. Element 25 may be a crystalline element, a liquid or gas medium whose response to two independent optical beams is to be studied.

If desired, a dye laser medium may be placed in the ring and one of lasers $L_1$ and $L_2$ may be used to laser pump it. Laser-pumped mode-locked dye lasers are well known and described in the literature. One example of such a laser is described in Optical Communications, Volume 4, page 195, November 1971. Also, a gas laser medium placed in the ring may be pumped by the optical beam of either of lasers $L_1$ or $L_2$, or by an optical beam directed to the ring from any other appropriate source.

The ring 10 togeher with a multiwavelength laser medium, designated in FIG. 3 by numeral 30, and a pair of external mirrors 31 and 32 may be used to produce simultaneous dual-wavelength laser oscillations. The two wavelengths are designated as $\lambda_1$ and $\lambda_2$. Mirrors 31 and 32, which are partially transmissive, are respectively optimized for the two wavelengths $\lambda_1$ and $\lambda_2$.

FIG. 4, to which reference is now made, is a diagram of an embodiment in which a second-harmonic output beam ($2\omega$) is produced along axis Y in response to a beam of a fundamental harmonic ($\omega$) incident on the ring 10 along axis X, from a laser 35. Placed in the ring is a second harmonic generation (SHG) crystal 36 and dispersive phase shifting element 37. In the absence of the phase shifting element 37 under normal conditions, the separate second-harmonic outputs emerging from each end of the SHG crystal 36 reach the beam splitter 11 with phases such that all of the second harmonic radiation, in common with all of the unconverted fundamental radiation, combine into single beam returning back along the laser 35 axis. Suppose, however, that the dispersive phase-shifting element 37 of length $l$ with an index of refraction $n_1$ at the fundamental frequency $\omega$, but with index $n_2 \neq n_1$ at the harmonic frequency $2\omega$, is inserted into the ring on one side of the SHG crystal 36, as shown in FIG. 4. Waves going in one direction counterclockwise (CCW) around the ring experience a fundamental phase shift $\phi_1$ (CCW) $= n_1\omega l/c$ before reaching the SHG crystal. This additional phase shift is subsequently converted by the SHG crystal into a double phase shift $\phi_2$ (CCW) $= 2\phi_1 = 2n_1\omega l/c$ for the second-harmonic radiation. For waves going in the other direction around the ring, the fundamental phase at the SHG crystal is unaltered, but the second-harmonic radiation subsequently receives an added phase shift $\phi_2$ (CW) = $2n_2\omega l/c$. If the dispersion in the phase shifter is sufficient to give these phase shifts a net difference of $\pm\pi$, so that $$\psi_2(CCW) - \psi_2 (CW) = 2(n_1 - n_2)\omega l/c = \pm\pi,$$

then the second-harmonic waves recombine at the beam splitter 11 with a phase difference such that all the harmonic radiation comes out the output port 17, along the transverse axis Y. The fundamental frequency behavior is unaltered since the fundamental wave eventually traverses the same added phase shift in both directions.

Figure 4B:
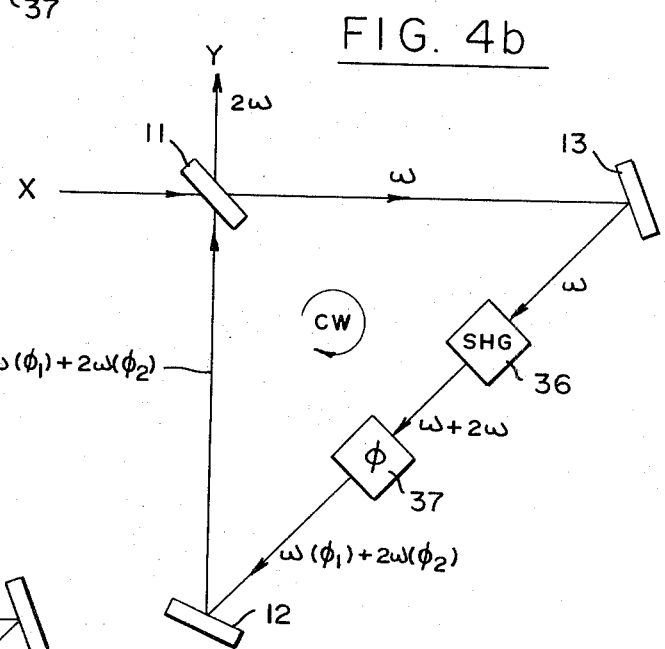

This aspect may further be clarified in conjunction with FIGS. 4a and 4b. FIG. 4a is a diagram of the wave propagating in the CCW direction. The fundamental harmonic is shifted by $\phi_1$ by shifter 37. Part of the fundamental harmonic is converted into a second harmonic by SHG crystal 36 which is shifted by $2\phi_1$. Thus, the wave components reaching the beam splitter 11 from mirror 13 are $\omega(\phi_1)$ and $2\omega(2\phi_1)$. FIG. 4b is a diagram of the wave propagating in the CW direction. As the fundamental harmonic passes through SHG crystal 36, part of it is converted into a second harmonic. The fundamental harmonic $\omega$ is shifted by $\phi_1$ by phase shifter 37, while the second harmonic component ($2\omega$) is shifted by $\phi_2$. Thus, the wave components which reach beam splitter 11 from mirror 12 are $\omega(\phi_1)$ and $2\omega(\phi_2)$. The fundamental harmonic components reaching from the two directions are shifted by the same degree $\phi_1$. Thus, they recombine to produce a back reflected wave at the fundamental harmonic along the X axis. However, the two second-harmonic components which reach the beam splitter 11 from mirrors 12 and 13 are shifted by $2\phi_1$ and $\phi_2$. They recombine to produce the second harmonic wave or beam which passes along axis Y only if $2\phi_1$ and $\phi_1$ are related by the above relationship.

It should be appreciated that various known crystal materials can be employed as the SHG crystal 36. For example, lithium niobate (LiNbO$_3$) or potassium dihydrogen phosphate (KDP) can be used for this purpose. Similarly, various materials may be employed for the dispersive phase shifter 37. These include, but are not limited to, glass, transparent crystals and organic liquids, such as CS$_2$.

Figure 5:
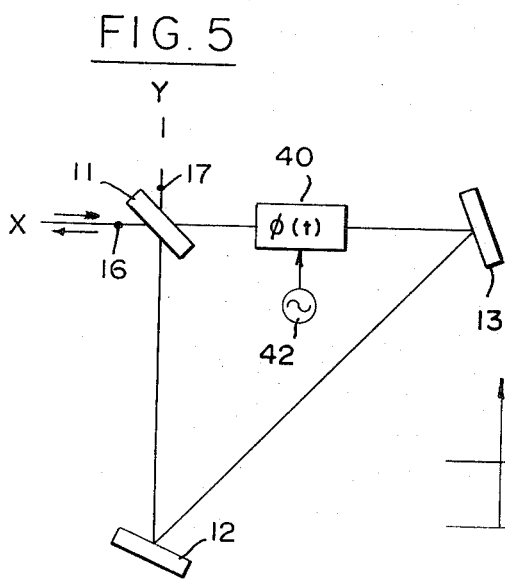
FIG. 5 is a diagram of another embodiment of the invention.

The antiresonant ring 10 can also be used to accomplish optical pulse switching, electro-optic laser mode locking, and laser cavity dumping by converting electro-optic phase modulation inside the antiresonant ring into amplitude or coupling modulation. Electro-optic phase modulators for optical beams, also sometimes known as Kerr cells or Pockels cells, are well known in the laser art. Suppose such a phase modulator 40 is placed inside the ring, immediately adjacent to the beam splitter, as shown in FIG. 5, and that the modulator gives an added phase modulation $\phi(t)$ to the light beams passing through it in response to a signal, e.g., an applied voltage from source 42. Waves going CCW around the ring are phase modulated by $\phi(t)$ immediately before they recombine at the beam splitter. However, there is a time delay equal to the ring transit time T before waves with the same phase modulation traveling in the opposite direction reach the beam splitter. The recombining of immediate and delayed phase-modulated signals leads to a conversion of phase modulation into amplitude modulation or modulated output coupling.

If a complex wave amplitude $\mu_{inc}(t)$ is incident on the beam splitter 11 from either one of the external arms or ports, e.g., port 16, the back-reflected wave through port 16 and the wave transmitted through port 17 can be expressed by $$\mu_{refl}(t) = r_1 t_1 g \left[ e^{i\phi(t)} + e^{i\phi(t-T)} \right] \mu_{inc}(t - T)$$

and $$\mu_{trans}(t) = g \left[ t_1^2 e^{i\phi(t-T)} - r_1^2 e^{i\phi(t)} \right] \mu_{inc}(t - T).$$

For the balanced 50-50 beam splitter case the transmitted or coupled-out wave amplitude is $$\mu_{trans}(t) = \tfrac{1}{2} \left[ e^{i\phi(t-T)} - e^{i\phi(t)} \right] \mu_{inc}(t - T).$$

This situation is particularly useful for converting phase modulation into coupling modulation. As three useful examples of this aspect consider the following:

Optical Pulse Switching

Figure 6A:
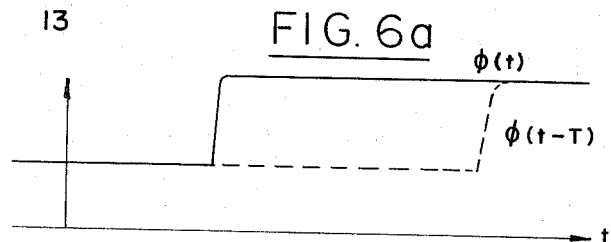
FIGS. 6a and 6b are waveform diagrams useful in explaining the embodiment shown in FIG. 5.
Figure 6B:
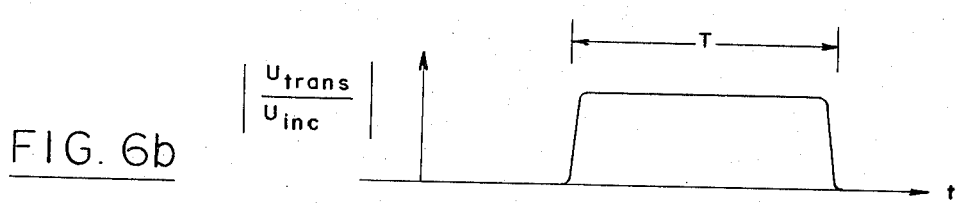

If for example, the phase modulation $\phi(t)$ is a step function with a rise time short compared to the transit time T around the ring, as shown in FIG. 6a, all of the optical beam energy contained within the antiresonant ring at the initial instant of the step function will emerge from the ring as an output along the Y axis during an interval of duration T following the initial instant, as shown in FIG. 6b. Thus, the ring acts as an optical gate or switch which is opened for a duration or period T by applying a step function to the modulator 40 in FIG. 5. If an optical beam consisting of a repeated sequence of optical pulses spaced by more than the duration T is incident upon the ring, the ring can be used as a controlled modulator or gate to either transmit or reflect each such pulse. This can be used to generate a so-called pulse-code-modulated (PCM) optical pulse train useful for optical signaling or optical communications purposes.

Cavity Dumping

If the modulated antiresonant ring of FIG. 5 is used as one end mirror of an oscillating laser cavity, the optical switching function just described can be used in particular for laser cavity dumping. If the laser is operating in a continuous or long-pulse fashion, such that the ring is normally filled with optical energy due to the laser oscillation, applying a step signal as in FIG. 6a will "dump" all of the laser energy stored inside the ring at the instant the step function is applied. This cavity dumping function is valuable in increasing the peak output power of a laser oscillator. If the modulator is moved away from the beam splitter toward the center of the ring, variable periods of length shorter than T can be obtained during which energy may be dumped along the Y axis. If the laser is simultaneously mode-locked by some other means and if the phase modulator 40 is switched while a mode locked pulse is inside the ring, that one mode-locked pulse can easily be dumped. Repeated switching at a low modulation level, so as to accomplish only partial dumping of pulses, might also be used to pulse-code modulate the output from a mode-locked laser.

Sinusoidal Modulation and Mode Locking

Low-level sinusoidal modulation of the phase $\phi(t) = \delta \cos \omega_m t$, with $\delta \ll 1$ will produce a sinusoidal output coupling modulation from the ring given by $$\left| \mu_{trans} \right|^2 \approx \delta^2 \sin^2 \omega_m T/2 \cdot \sin^2 \omega_m(t - T/2).$$

This modulation if carried out at a modulation frequency matching the frequency at which optical pulses naturally circulate within the laser cavity will produce mode locking of the laser as is commonly accomplished in lasers by other modulation methods. This mode-locking behavior should result in particular when the intra-ring modulator is driven at either the $c/2L$ or half the $C/2L$ frequency of the laser cavity.

The $\sin^2 \omega_m T/2$ factor in the above expression reduces the amplitude modulation depth, depending upon the ratio of the ring transit time $T$ to the modulation period $1/\omega_m$. If the main part of the laser cavity is long compared to the distance around the ring, this loss of modulation index in the mode-locking case will be severe. The rise-time requirement on the phase step in the cavity-dumping case will also be severe and only the ring itself and not the entire laser cavity will be dumped. Both difficulties can be mitigrated simply by placing the laser medium inside the ring and making the ring itself be the main portion of the laser cavity, as shown in FIG. 3, but with only one external laser mirror.

Though particular embodiments of the invention have been described and illustrated herein, it is recognized that modifications and variations may readioy occur to those skilled in the art and consequently, it is intended that the claims be interpreted to cover such modifications and equivalents.

What is claimed is:

1. An optical system comprising:
    an antiresonant optical ring including a beam splitter with a beam splitting face responsive to an optical beam directed thereto along a first axis for reflecting a first portion of said beam along a second axis, and for transmitting a second portion of said beam through said beam splitting face, and means for directing said reflected first beam portion back to said beam splitting face along said first axis and for directing said transmitted second beam portion back to said beam splitting face along said second axis, whereby said first and second beam portions circulate in said ring in opposite directions, said beam splitting face being characterized by a transmissiion coefficient definable as $t_1$ and a reflection coefficient definable as $r_1$ whereby said beam splitter reflects along said second axis some of said first beam portion which is directed thereto, and transmits some of said first beam portion along said first axis, and further reflects along said first axis some of said second beam portion which is directed thereto, and transmits some of said second beam portion along said second axis;
    means exterior to said ring for directing said optical beam to said beam splitting face along said first axis; and
    phase control means inside said ring for controlling the relative phases of the first and second beam portions circulating in said ring.

2. The system as described in claim 1 wherein said phase control means inside said ring comprise a phase shifter and signal source means for applying a signal to said phase shifter to control the magnitude of the phase shift experienced by any beam portion passing through said phase shifter.

3. The system as described in claim 2 wherein $t_1$ is substantially equal to $r_1$.

4. The system as described in claim 2 wherein said means for directing of said ring comprise at least a first reflective mirror located along said first axis and a second reflective mirror located along said second axis.

5. The system as described in claim 1 further including a second-harmonic generation medium in said ring for converting at least part of a beam portion of a fundamental frequency, definable as $\omega$, into a beam portion of a frequency $2\omega$ and said phase control means comprise dispersive phase shifting means of a preselected length having different indices of refraction for beams at frequencies $\omega$ and $2\omega$.

6. The system as described in claim 5 wherein $t_1$ is substantially equal to $r_1$.

7. The system as described in claim 5 wherein said means for directing of said ring comprise at least a first reflective mirror located along said first axis and a second reflective mirror located along said second axis.

8. An optical system comprising:
    an antiresonant optical ring including a beam splitter having a beam splitting face with first and second opposite sides and with a transmission coefficient $t_1$ and a reflection coefficient $r_1$ of either of said sides, where $t_1 = r_1$ and at least first and second ring beam reflective mirrors, positioned with respect to one another and said beam splitter, whereby a first optical beam directed to the first side of said beam splitting face along a first axis propagates through said ring as two components propagating in opposite directions which are recombined by said beam splitter at said beam splitting face into a first beam which is directed back only along said first axis from said beam splitter, and whereby a second optical beam directed to the second side of said beam splitting face along a second axis which is perpendicular to said first axis, propagates through said ring as two components propagating in opposite directions which are recombined at said beam splitter into said second beam which is directed back only said second axis from said beam splitter;
    first means along said first axis for directing said first optical beam to said beam splitter along said first axis; and
    second means along said second axis for directing said second optical beam to said beam splitter along said second axis.

9. The system as described in claim 8 wherein said first means comprise a first external mirror and a first laser medium for producing said first optical beam and for directing the first beam to said beam splitter and for responding to the first beam which is directed therefrom, and said second means comprise a second external mirror and a second laser medium for producing said second optical beam along said second axis and for responding to the second beam directed from said beam splitter along said second axis.

10. The system as described in claim 9 wherein said system further includes a medium in said ring responsive to the components of said first and second beams which propagate through said ring.

11. The system as described in claim 8 wherein said system further includes a multiwavelength laser medium for stimulating the emission of said first beam at a wavelength definable as $\lambda_1$, and for stimulating the emission of said second beam at a wavelength definable as $\lambda_2$, said first means comprising a first exterior mostly reflective mirror along said first axis for reflecting back to said beam splitter along said first axis most of the first beam directed thereto from said beam splitter, and said second means comprise a second exterior mostly reflective mirror along said second axis for reflecting back to said beam splitter along said second axis most of the second beam directed thereto from said beam splitter.

12. The system as described in claim 11 wherein said first and second exterior mirrors are optimized for the wavelengths $\lambda_1$ and $\lambda_2$, respectively.

13. An optical second harmonic generator comprising:

laser means for producing an optical beam at an angular frequency $\omega$ along a first axis;

an antiresonant optical ring including a beam splitter positioned along said first axis and first and second ring mirrors, with said beam splitter splitting the optical beam directed thereto into a first beam portion which is reflected to said first mirror and therefrom through said second mirror to said beam splitter, and into a second beam portion which is transmitted through said beam splitter to said second mirror, said second beam portion being successively reflected by said second and first mirrors to said beam splitter, said beam splitter transmitting a part of said first beam portion and reflecting a part of said second beam portion along said first axis, and reflecting a part of said first beam portion and transmitting a part of said second beam portion along a second axis; and means in said ring between said first and second mirrors for affecting the portions of the beam passing between said mirrors in both directions so that the combined parts of said first and second beam portions along said second axis are characterized by an angular frequency $2\omega$.

14. The generator as described in claim 13 wherein said beam splitter is characterized by a transmission coefficient which is substantially equal to its reflection coefficient and wherein said means in said ring include a dispersive phase shifter of length $l$ with an index of refraction $n_1$ at the angular frequency $\omega$ and an index of refraction $n_2$ at an angular frequency $2\omega$, and a medium in series between said first and second mirrors, said medium converting the angular frequency of part of a beam of angular frequency $\omega$ passing therethrough in either direction into an angular frequency $2\omega$, said phase shifter and said medium shifting and phase of the beam passing between said first and second mirrors in one direction by $2n_1\omega l/c$, $c$ being the speed of light and the beam passing between the two mirrors in an opposite direction by $2n_1\omega l/c$ so that $$2(n_1 - n_2)\omega l/c = \pm\pi.$$

* * * * *